United States Patent [19]

Takayama et al.

[11] Patent Number: 5,087,300

[45] Date of Patent: Feb. 11, 1992

[54] METHOD FOR MANUFACTURING HIGH-CONDUCTIVITY COPPER-CLAD STEEL TROLLEY WIRE

[75] Inventors: Teruyuki Takayama, Tokyo; Hiroki Nagasawa; Sumihisa Aoki, both of Kokubunji; Haruo Tominaga; Kazuo Yokoyama, both of Tokyo, all of Japan

[73] Assignee: Fujikura Ltd., Tokyo, Japan

[21] Appl. No.: 570,792

[22] Filed: Aug. 22, 1990

[30] Foreign Application Priority Data

Sep. 1, 1989 [JP] Japan .............................. 1-226965
Mar. 20, 1990 [JP] Japan .............................. 2-70049

[51] Int. Cl.$^5$ .................................... B32B 31/20
[52] U.S. Cl. ............................ 148/11.5 Q; 427/360; 427/436
[58] Field of Search ............... 428/607, 676, 677; 191/22 DM, 33 PM, 29 DM; 148/11.5 Q, 11.5 C, 127; 427/431, 436, 360, 383.7

[56] References Cited

U.S. PATENT DOCUMENTS

| | | | |
|---|---|---|---|
| 309,439 | 12/1884 | Chillingworth et al. | 428/676 |
| 309,509 | 12/1884 | Paul et al. | 428/676 |
| 689,615 | 12/1901 | Heyl-Dia | 428/677 |
| 1,101,579 | 6/1914 | Steinberger | 191/33 PM |
| 2,036,667 | 4/1936 | Williams | 428/677 |
| 2,196,002 | 4/1940 | Whitney et al. | 428/676 |
| 2,314,882 | 3/1943 | Hensel et al. | 428/677 |
| 3,088,195 | 5/1963 | Noethlich et al. | 428/676 |

FOREIGN PATENT DOCUMENTS

| | | | |
|---|---|---|---|
| 14042 | 8/1933 | Australia | 191/33 PM |
| 149063 | 7/1985 | European Pat. Off. | |
| 298518 | 1/1989 | European Pat. Off. | 191/33 PM |
| 642647 | 2/1937 | Fed. Rep. of Germany | 191/33 PM |
| 690728 | 4/1940 | Fed. Rep. of Germany | 191/33 PM |
| 1269856 | 6/1968 | Fed. Rep. of Germany | |
| 47-31908 | 8/1972 | Japan | 428/676 |
| 59-170250 | 9/1984 | Japan | 428/676 |
| 59-43332 | 10/1984 | Japan | 191/33 PM |
| 190025 | 6/1937 | Switzerland | 191/33 PM |
| 454121 | 9/1936 | United Kingdom | 191/33 PM |

OTHER PUBLICATIONS

Patent Abstracts of Japan: Production of Coated Steel Wire, 62-30866, Tominaga.

*Primary Examiner*—John J. Zimmerman
*Attorney, Agent, or Firm*—Oblon, Spivak, McClelland, Maier & Neustadt

[57] ABSTRACT

First, a steel wire is continuously dipped in molten copper or molten copper alloy so that copper or copper alloy builds up and solidifies on the peripheral surface of said steel wire, thereby obtaining an initial copper-clad steel wire. Then, the initial copper-clad steel wire is subjected to a first cycle of hot rolling by a caliber roll. The hot-rolled wire is dipped in molten copper or molten copper-alloy at least once so that copper or copper alloy builds up and solidifies thereon, thereby obtaining a final copper-clad steel wire.

The final copper-clad steel wire is hot-rolled at a temperature of 750° to 850° C. and with a rolling ratio of 10 to 40%. Then, the hot-rolled wire is cold-rolled with a reduction of area of 20% or more.

Thus, 75 to 95% of the cross sectional area of the obtained copper-clad steel trolley wire is occupied by the copper or copper alloy covering layer so that the electric conductivity of the trolley wire is as high as 80% IACS or more. Moreover, the cast rod is hot-rolled so that the core and the covering layer are metallurgically bonded to each other, thereby obtaining a copper-clad steel trolley wire whose core and covering layer are firmly bonded. Also, the hot-rolled wire is cold-rolled so that a trolley wire with high strength is obtained.

4 Claims, 3 Drawing Sheets

METHOD FOR MANUFACTURING HIGH-CONDUCTIVITY COPPER-CLAD STEEL TROLLEY WIRE

BACKGROUND OF THE INVENTION

The present invention relates to a copper-clad steel trolley wire, composed of a core formed of a steel wire and a copper or copper-alloy covering layer thereon, and a method for manufacturing the same, and more particularly, to a copper-clad steel trolley wire enjoying high electrical conductivity, high strength, and improved wear resistance, and permitting easy detection of its wear limit, and a method for manufacturing the same.

Conventionally, copper wires or copper alloy wires are used for railroad-use trolley wires. The trolley wires have been required to have high electrical conductivity and improved wear resistance. The electric trains of nowadays are positively expected to travel at high speed, so that the trolley wires are required to have improved strength.

In order to increase the traveling speed of the electric trains, the wave propagation velocity of the trolley wires should be increased in advance. The wave propagation velocity C may be given by $$C = \sqrt{T/d},$$

where T is the wiring tension, and d is the linear density (weight per unit length) of a trolley wire.

As seen from the equation, the wave propagation velocity C can be increased by heightening the tension T or by lowering the linear density d.

Thereupon, an aluminum-composite trolley wire is proposed as a trolley wire with lower linear density d and higher propagation velocity C. This wire is composed of a steel wire and an aluminum covering layer pressure-bonded thereto.

Also proposed is a composite trolley wire which combines a copper-based material and an iron-based material of higher strength than copper. This trolley wire is improved in strength by the inclusion of the iron based material. By thus improving the strength of the trolley wire, the wiring tension T can be set higher than in the conventional case, to increase the propagation velocity C (see Japanese Patent Disclosure No. Sho 53-22786).

According to the aluminum-composite trolley wire, however, metal fixtures currently used are made of copper alloy, so that galvanic corrosion may be caused between the metal fixtures and the aluminum covering layer of the trolley wire. Such corrosion can be avoided only by forming the metal fixtures from a material which cannot suffer galvanic corrosion with aluminum. This countermeasure is not practical, however, in view of cost performance.

Although the copper-clad steel trolley wire is improved in strength and wear resistance, its copper covering rate is as low as 45 to 75%, so that its maximum electrical conductivity is lower than 80%. If the traveling section of an electric train is an AC section, the low conductivity arouses no problem. In the case of a DC section, however, the low conductivity results in substantial lowering of the current efficiency, therefore the trolley wire used should have high electrical conductivity.

As mentioned before, moreover, the trolley wire should be rewired when its residual diameter is reduced to a predetermined value corresponding to a wear limit. In order to detect the wear limit, the wire diameter must, for example, be manually measured at night throughout the wire arrangement, by means of an optical wire diameter measuring device. This measurement work, which is expected to be conducted periodically, is very troublesome. Thus, there is also a request for an improvement of the way of detecting the wear limit.

In the case of a composite trolley wire composed of iron-based material and copper-based material, furthermore, corrosion is liable to be caused at the boundary between the two materials, and there are many obstacles to practical use. A method for preventing corrosion is proposed such that a lead or tin layer is interposed between the iron- and copper-based materials. However, the interposition of such an intermediate layer is not advisable because it lowers the strength of the trolley wire and makes the manufacturing processes complicated.

SUMMARY OF THE INVENTION

The object of the present invention is to provide a copper-clad steel trolley wire enjoying high electrical conductivity and high strength, free from corrosion at boundary portions, and permitting easy detection of its wear limit, and a method capable of manufacturing the same at low cost.

According to the present invention, there is provided a copper-clad steel trolley wire, which comprises a core formed of a steel wire; and a covering layer formed of copper or copper alloy and covering the peripheral surface of said core, said covering layer occupying 75 to 90% of the cross-sectional area of said copper-clad steel trolley wire, said core and said covering layer being metallurgically bonded to each other.

According to the present invention, there is also provided a method for manufacturing a high-conductivity copper-clad steel trolley wire, which comprises the steps of continuously dipping a steel wire in molten copper or molten copper alloy so that copper or copper alloy builds up and solidifies on the peripheral surface of said steel wire, thereby obtaining an initial copper-clad steel wire; subjecting said initial copper-clad steel wire to a first cycle of hot rolling by means of a caliber roll; dipping the hot-rolled wire in molten copper or molten copper-alloy at least once so that copper or copper alloy builds up and solidifies thereon, thereby obtaining a final copper-clad steel wire; subjecting said final copper-clad steel wire to a second cycle of hot-rolling at a temperature of 750° to 850° C. and with a rolling ratio of 10 to 40%; and cold-rolling the hot-rolled wire with a reduction of area of 20% or more.

The copper-clad steel trolley wire according to the present invention, which uses a steel wire as a core, can be improved in strength, so that it enables high-speed traveling of electric trains. Since the core is coated with a copper or copper-alloy covering layer, it can be prevented from undergoing galvanic corrosion with copper-alloy fixtures. Since the covering rate of the copper or copper-alloy covering layer is as high as 75 to 90% in terms of the cross sectional area ratio, moreover, a very high electrical conductivity of 80% IACS or more can be obtained. Thus, the wire can be installed also in a DC section. Further, the steel core and the copper or copper-alloy region of the covering layer are metallurgically bonded to each other, so that corrosion can be prevented from advancing at the boundary between the two regions.

According to the method of the present invention, the aforementioned high-conductivity copper-clad steel trolley wire can be steadily manufactured at low cost.

DETAILED DESCRIPTION OF THE PREFERRED EMBODIMENTS

Figure 1:
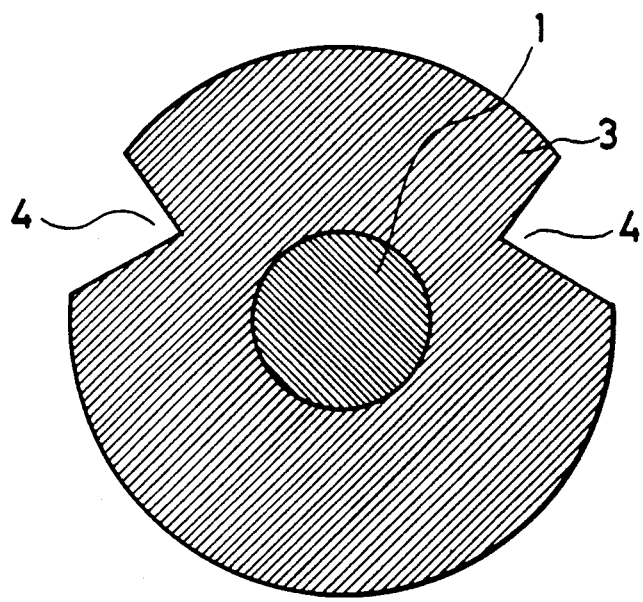
FIG. 1 is a sectional view of a copper-clad steel trolley wire according to an embodiment of the present invention, as taken along the diameter thereof.

As shown in FIG. 1, the trolley wire has core 1 formed of a steel wire in its central portion. Core 1 is covered by covering layer 2 with a substantially uniform thickness. Covering layer 2 is formed of copper or copper alloy, and a pair of V-shaped grooves 3 are formed on the peripheral surface of covering layer 2 so as to extend in the longitudinal direction of the trolley wire. Grooves 3 are held by means of metal fixtures (not shown), whereby the trolley wire is suspended.

The steel wire is used as core 1 in order to improve the strength of the trolley wire. Any type of steel may be used for core 1. If the strength of the steel wire is too high, however, the trolley wire will be awkward to handle during its manufacturing processes or wiring work. Preferably, therefore, the material of the steel wire should have a carbon content of 0.35% or less by weight. If the carbon content is higher than 0.35% by weight, then the strength of the steel wire is so high that the life of a shaving die is shortened during the manufacturing processes for the composite wire by the so-called dip forming method, for example.

The trolley wire with steel core 1 has high strength so that the wiring tension T can be set high enough to increase the propagation velocity C. Thus, the traveling speed of the electric trains can be increased.

The copper or copper alloy is used as the covering layer 2 in order to secure the required electrical conductivity of the trolley wire and to prevent galvanic corrosion with the metal fixtures.

To prevent the current efficiency at a direct current section from lowering, in this case, the electrical conductivity should be set to 80% IACS or more. For high-speed traveling of electric trains, moreover, the wiring tension should be set to 1,200 kgf or more. To attain this, it is necessary that the tensile load be 3,000 kgf at the wear limit and be 4,500 kgf or more at the start of use.

In order to achieve this purpose, the covering rate of the copper or copper-alloy covering layer of the copper-clad steel composite wire should be adjusted to 75 to 90% in terms of the cross-sectional area ratio (ratio of the cross-sectional area of the covering layer to that of the whole trolley wire).

If the covering rate of the copper or copper-alloy covering layer is less than 75%, the copper or copper-alloy portion, which is higher in electrical conductivity, is too little to adjust the electrical conductivity of the composite wire to 80% or more.

If the covering rate exceeds 90%, on the other hand, the steel core portion is too little to ensure satisfactory strength, so that a tensile load of 4,500 kgf or more cannot be obtained.

In the conventional copper-clad steel trolley wire, the covering rate of the copper or copper-alloy covering layer ranges from 45 to 75%. Even though the steel core is exposed, therefore, the diameter of the remaining portion is large, so that the wear limit of the trolley wire is not reached yet. Despite the exposed core, therefore, the trolley wire can continue to be used. According to the present invention, however, the covering rate of the copper or copper-alloy covering layer is as high as 75 to 90%. If the steel core is exposed, therefore, the diameter of the remaining portion is so small that the trolley wire must be rewired again. In other words, if the trolley wire wears during use, the wear limit is reached just when steel core 1 is exposed. In the present invention, therefore, the attainment of the wear limit can be noticed by detecting the exposure of the steel core portion. This exposure of the steel wire can be fully detected by the naked eye, without requiring use of any large-sized apparatus, such as a conventional optical measuring apparatus, so that the operating efficiency is very high. If the covering rate of the copper or copper-alloy covering layer exceeds 90%, however, the exposure of the steel wire cannot be used as an index of the wear limit. Also for this reason, the covering rate should be set to 90% or less.

Since the copper-clad steel trolley wire is covered by copper or copper-alloy covering layer 2 at the given covering rate, moreover, covering layer 2 is in contact with fixtures for mounting the trolley wire. Thus, galvanic corrosion cannot be caused between covering layer 2 and the copper-alloy fixtures.

The steel wire of core 1 and the copper or copper-alloy region of covering layer 2 are metallurgically bonded to each other. In the composite wire in which the covering layer is metallurgically bonded to the core, atoms diffuse at the interface between the steel wire and the copper or copper-alloy region, thereby ensuring very strong bonding. Therefore, even if a compressive load is applied to the composite wire in the diametrical direction thereof, for example, the steel wire and the copper or copper-alloy region cannot be separated from each other. This also applies to a case such that the composite wire is subjected to tensile fracture stress or bending stress.

Figure 2:
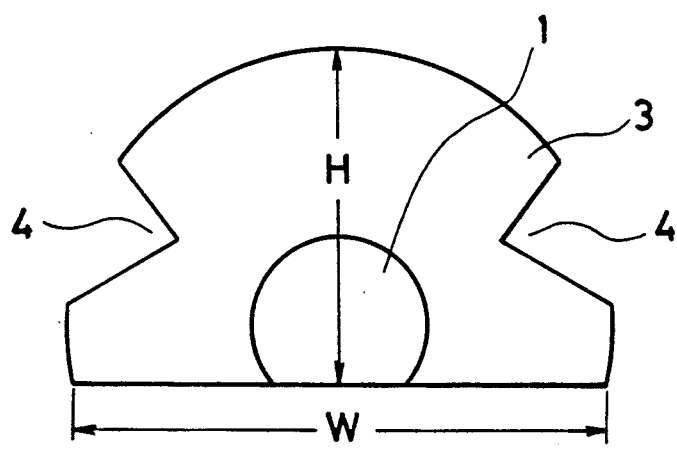
FIG. 2 is a diagram showing the trolley wire after abrasion.

Accordingly, even if the trolley wire is worn away so that the steel core 1 is exposed, as shown in FIG. 2, water or the like can be prevented from penetrating the boundary between the core 1 and the copper or copper-alloy covering layer 2. Thus, the boundary region cannot be corroded with priority.

Since the covering rate is restricted within the range from 75 to 90%, moreover, the wear limit can be easily detected. As the trolley wire wears due to sliding of a pantograph, its diameter decreases, as shown in FIG. 2. If its residual height H is reduced to a given value, the trolley wire must be replaced with a new one. In such a case, the degree of abrasion of the trolley wire is conventionally grasped by directly measuring the height H or by measuring the width W for the estimation of the height H. Thus, an operator is expected to measure the size H or W throughout the whole length of the trolley wire by using a measuring instrument, and this is very troublesome work. In the present embodiment, however, the covering rate of copper ranges from 75 to 90%, so that the steel core portion of the copper-clad steel trolley wire is exposed just when the wear limit is reached. Thus, the wear limit can be easily identified by visually observing exposure of the steel core 1.

The following is a description of test results for the properties of copper-clad steel trolley wires according to specific examples of the present invention, along with test results for the properties of trolley wires according comparative examples and a prior art example. The trolley wires according to the examples of the invention were manufactured in the following manner, using steel wire provided by JISG-3505 as the steel core. First, the steel wire was coated with copper or copper alloy by a dip forming method, whereupon a cast wire with a diameter of 20 mm was obtained. Thereafter, the cast wire was rolled into a wire with a diameter of 17 mm, which was then drawn into a wire with a diameter of 13.1 mm and grooved. Then, the wire was subjected to final drawing, whereupon trolley wires having the cross-sectional shape shown in FIG. 1 and a cross-sectional area of 110 mm² were obtained.

These individual trolley wires were measured for their electrical conductivity, tensile load, wear limit load, wear limit conductor resistance, wiring tension, and wave propagation velocity, and the measured values are shown in Table 1 below.

Trolley wires with the various covering rates shown in Table 1 were manufactured by changing the time of dipping in molten metal. The properties of the prior art example are those of a pure-copper trolley wire.

TABLE 1

|  | Example | | | Prior Art Example |
|---|---|---|---|---|
|  | W1 | W2 | W3 | W1 |
| Copper covering rate (%) | 78 | 80 | 85 | pure copper wire |
| conductivity (% IACS) | 80.4 | 82.1 | 86.7 | 99.2 |
| tensile load (kgf) | 5040 | 4890 | 4500 | 4000 |
| wear limit load (kgf) | 3350 | 3250 | 3000 | 2380 |
| wear limit conductor resistance (Ω/cm) | 0.345 | 0.336 | 0.317 | 0.251 |
| wiring tension (kgf) | 1340 | 1300 | 1200 | 1000 |
| wave propagation velocity | 1.16 | 1.14 | 1.10 | 1.00 |

In any of the cases of Examples W1 to W3, as shown in Table 1, the electrical conductivity is 80% or more, which is high enough, and the tensile load is as high as 4,500 kgf or more, so that the wiring tension can be set to 1,200 kgf or more. In the case of the prior art trolley wire, on the other hand, although the conductivity is high enough, the tensile load is so low that the wiring tension is as low as 1,000 kgf. Accordingly, the trolley wires of Examples W1 to W3 have a wave propagation velocity 1.10 times as high as that of the prior art copper trolley wire or more. Thus, the traveling speed of the electric trains can be increased.

Although the trolley wires with a cross-sectional area of 110 mm² have been described in connection with the aforementioned embodiment, it is to be understood that the present invention may be also applied to trolley wires of any other types, e.g., ones with a cross-sectional area of 170 mm².

The following is a description of an embodiment of a method according to the present invention.

First, a steel wire as a core is dipped in molten copper (or molten copper alloy) to build up and solidify copper (or copper alloy) on the peripheral surface of the steel wire.

Figure 3:
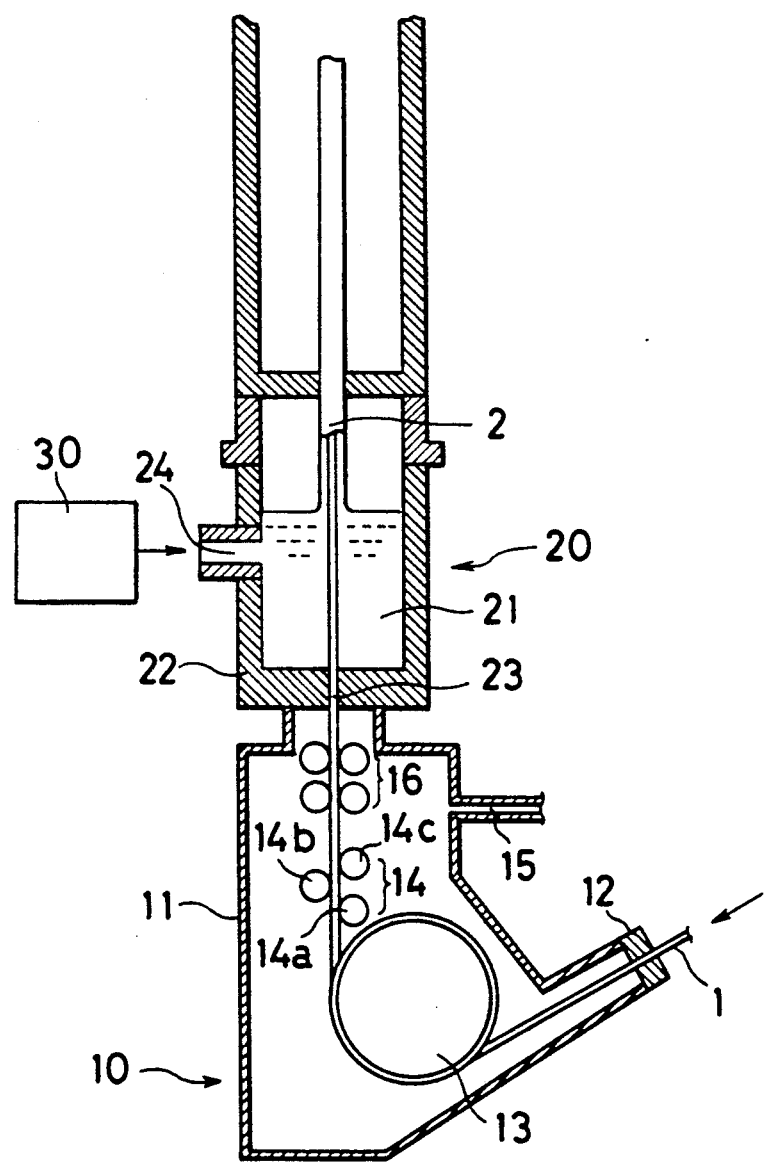
FIG. 3 is a sectional view showing a dip forming apparatus.

FIG. 3 shows a so-called dip forming apparatus used in a process for the molten copper (or molten copper alloy) build-up. In this dip forming apparatus, copper or copper-alloy covering unit 20 is disposed over wire feeder unit 10.

Airtight housing 11 of feeder unit 10 is provided with exhaust port 15, which is coupled to a suitable vacuum exhaust unit (not shown). The inside of housing 11 is evacuated through exhaust port 15 to be kept at a predetermined degree of vacuum. Then, non-oxidizing gas is introduced into housing 11 to keep housing 11 in a non-oxidizing atmosphere. Shaving die 12 is located at a wire inlet of the lateral wall of housing 11. Steel wire 1 is fed through this inlet into housing 11, and its outermost surface layer is cut off by means of shaving die 12.

Capstan 13 is set in housing 11, and steel wire 1 is wound around capstan 13 to be pulled and redirected upward thereby. Two pairs of pinch rollers 16 are arranged inside the upper portion of housing 11. Steel wire 1 is driven to be drawn out by means of pinch rollers 16 so that it is fed from housing 11 into covering unit 20.

Straightening unit 14 for correcting a bend of steel wire 1 is disposed in that region inside housing 11 between pinch rollers 16 and capstan 13. Straightening unit 14 includes two rollers 14a and 14c, adapted to roll on the inside of steel wire 1 bent by capstan 13, and roller 14b rollable on the outside of the steel wire 1 between rollers 14a and 14c. Steel wire 1 fed from capstan 13 is brought into rolling contact with rollers 14a, 14b and 14c in succession, whereby its bend, produced by capstan 13, is corrected. Rollers 14a, 14b and 14c may be rotated positively by means of a suitable drive unit (not shown) or be driven like an idler only by steel wire 1. The distances between rollers 14a, 14b and 14c can be adjusted depending on the type of the steel wire, the degree of the bend, etc.

In the present embodiment, steel wire 1, having been passed around capstan 13 and bent, are straightened by means of rollers 14a, 14b and 14c of the straightening unit 14. A conventional dip forming apparatus for copper wire is not provided with such a straightening unit. When dip-forming the steel wire, as in the case of this embodiment, it is difficult to introduce the steel wire smoothly into crucible 22 without the use of straightening unit 14.

Since steel wire 1 is harder than a copper wire, it positively bends when it is passed around capstan 13. The bend cannot be corrected by only pulling steel wire 1 by means of pinch rollers 16. Thus, the steel wire 1 may possibly be caught by insertion aperture 23 of crucible 22, thereby interrupting the operation. In the present embodiment, however, steel wire 1 is straightened by means of three rollers 14a.14b and 14c, it can be fed steadily into crucible 22 without jamming or interference at aperture 23.

Covering unit 20 includes crucible 22 which is stored with molten copper or copper alloy 21. Crucible 22, which is made of refractory material such as graphite, is coupled to housing 11 of feeder unit 10 in a manner such that the top outlet of housing 11 is closed airtight by the outer bottom surface of crucible 22. Crucible 22 is formed, at its bottom portion, with insertion aperture 23 having little larger diameter than steel wire 1. Thus, steel wire 1 is introduced into crucible 22 through aperture 23, in a liquid-tight manner.

Molten metal feed port 24, which is formed in the flank of crucible 22, is connected to copper or copper-alloy melting unit 30. Thus, molten metal 21 is fed into crucible 22 through feed port 24.

A wire draw-out unit (not shown) is disposed above covering unit 20. Composite cast rod 2, which is composed of steel wire 1 covered by copper or copper alloy, is drawn out upward by means of the draw-out unit.

In a first copper or copper-alloy dip forming process using the dip forming apparatus, steel wire 1 is first introduced into housing 11, which is kept in a non-oxidizing atmosphere, in a manner such that a surface layer of wire 1 is continuously ground by means of shaving die 12, as shown in FIG. 3. Steel wire 1, having a clean surface, is wound around capstan 13 to change its advancing direction upward. In this case, although steel wire 1 is given a tendency to bend by capstan 13, it is straightened by means of rollers 14a, 14b and 14c.

Subsequently, steel wire 1 is pulled out upward by means of pinch rolls 16, and is introduced into crucible 22 through inlet hole 23 at the bottom portion of coating unit 20. Then, steel wire 1 is pulled up in crucible 22 so that molten metal 21 in the crucible builds up and solidifies on the wire. Thus, composite wire 2 with copper on the peripheral surface of steel wire 1 is obtained.

The resulting copper-clad steel wire is subjected to a first cycle of hot rolling by means of a caliber roll. This may be done by using a hot rolling apparatus which includes a conventional caliber roll. After copper (or copper alloy) is thus built up on the steel wire in a first process of molten copper dipping, a first-layer copper (or copper alloy) portion and the steel wire are firmly metallurgically bonded to each other during the first hot rolling cycle.

Figure 4:
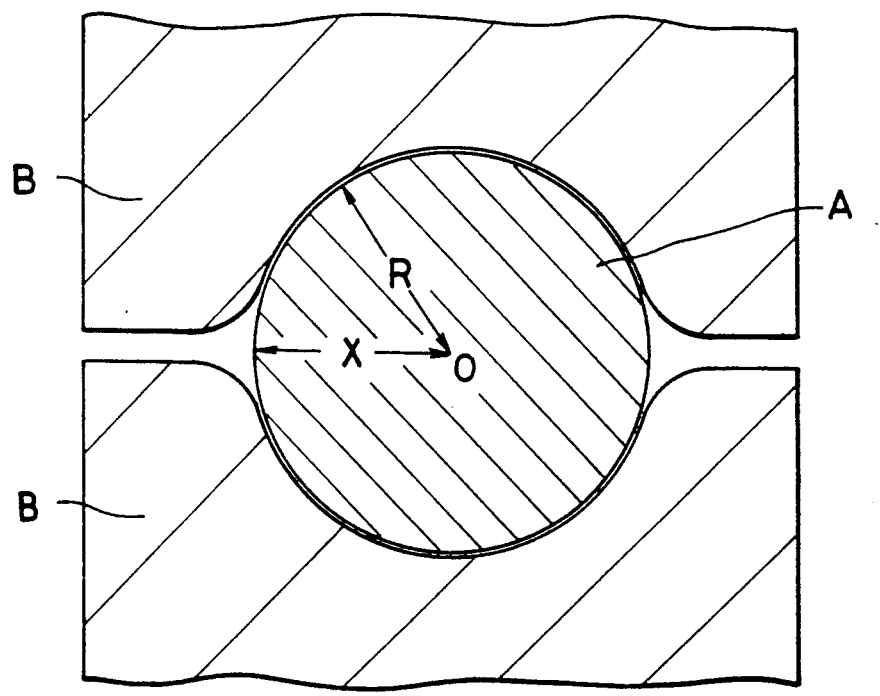
FIG. 4 is a sectional view for illustrating conditions provided by the present invention.

In the present invention, the first hot rolling cycle is preferably effected under the condition based on the range given by $$0.97 \leq X/R \leq 1.10, \quad (1)$$

where R is the distance between the surface of wire A at a concave contact position of caliber roll B and center O of the wire, as shown in FIG. 4, and X is the distance between the surface of wire A at a non-contact position of roll B and center O.

The following is a description of the reason why the aforesaid condition should be observed. Before the core is dipped in the molten copper, its surface is cleaned by scalping. Before this scalping, moreover, the core is usually drawn to harden its surface. In doing this, a single-material wire, such as a steel or copper wire, has no problem because of its homogeneity. If the core is a composite wire such as a copper-clad steel wire, which is composed of different materials, however, the cross-sectional shape will be distorted by the drawing work. Namely, if the ratio X/R is lower than 0.97, the sectional shape is somewhat laterally depressed. Thus, if the copper-clad steel wire is drawn before scalping, copper or copper alloy in the upper or lower half of the copper coating portion of the wire, which has a relatively long diameter, flows into the depressed lateral portion, thereby causing the copper coating portion to fold up, since the copper coating portion is softer and more deformable than the steel core portion. Inevitably, therefore, axial grooves are continuously formed on the lateral face of the wire.

If the ratio X/R is higher than 1.10, on the other hand, a projection is formed on the lateral face of the copper-clad steel wire. If this wire is drawn before scalping, therefore, the copper coating portion of the lateral projection flows in the circumferential direction of the copper-clad steel wire, since the steel wire portion of the core is hard. Thus, the so-called blushing is caused at the upper- and lower-half portions. Also in this case, therefore, grooves are formed extending in the axial direction of the copper-clad steel wire.

In either case, if there are grooves or blushing, they sometimes cannot be thoroughly removed even though the surface is ground by means of the shaving die. Thereupon, lubricating oil remains at regions where the grooves or blushing exist. When the copper-clad steel wire is dipped in the molten copper in a second process of molten copper dipping and the subsequent processes, therefore, the molten copper fails to build up on the regions for the grooves or blushing, so that there are produced local portions where the copper covering layer is relatively thin. This constitutes a substantial drawback of the copper-clad steel wire.

Thus, the external dimensions at the time of the first cycle of hot rolling greatly influence the quality of the copper-clad steel trolley wire as a product. Preferably, the ratio X/R for the first hot rolling cycle is set within the range given by inequality (1).

Subsequently, the rolled wire is dipped again in the molten copper (or molten copper alloy) using the same dip forming apparatus shown in FIG. 3. By doing this, copper (or copper alloy) is caused further to build up and solidify on the peripheral surface of the wire. In this process, a copper-clad cast steel rod is obtained in which copper (or copper alloy) occupies a very high percentage of the cross-sectional area. This molten copper dipping process may be repeated twice or more.

The processes of molten copper dipping and hot rolling are thus repeated twice or more because one cycle of molten copper dipping cannot ensure a sufficient coverage of copper (or copper alloy) for a high-conductivity trolley wire. By repeating the processes of molten copper dipping and hot rolling twice or more, on the other hand, enough copper (or copper alloy) can be built up on the steel wire to produce a high-conductivity copper-clad steel wire. By this method, moreover, a wire, such as a trolley wire, having a relatively large diameter and adapted to be coated with a thick copper (or copper alloy) covering layer, can be manufactured at lower cost than by electroplating or other methods.

Subsequently, the copper-clad steel wire is hot-rolled at a temperature of 750° to 850° C. and with a rolling ratio of 10 to 40%. Thus, after the first hot rolling cycle, the wire is further dipped in the molten copper, and is then hot-rolled under the aforesaid conditions. By doing this, the first-layer copper (or copper alloy) portion and a second-layer copper (or copper alloy) portion built up in the second molten copper dipping process and the subsequent processes are firmly metallurgically bonded to each other. Thus, the copper-clad steel trolley wire obtained enjoys a high bonding strength at the boundary between the steel wire and the copper (or copper alloy) coating portion, and corrosion can be prevented from advancing at the boundary.

If the rolling ratio for this final hot rolling process is lower than 10%, satisfactory metallurgical bonding cannot be ensured between the steel wire and the copper or copper-alloy region and between the first- and second-layer copper portions. If the rolling ratio exceeds 40%, on the other hand, the degree of rolling is too high to obtain a uniform coating thickness of the copper or copper-alloy covering layer. For these reasons, the rolling ratio according to the present invention is set within the range from 10 to 40%. Further, the rolling temperature is set within the range from 750° to 850° C. in order to smooth the rolling with the aforesaid rolling ratio, as well as to obtain a high metallurgical bonding strength.

Subsequently, after the hot rolling process, the wire is cold-drawn with a reduction of area of 20% or more. This may be done by means of a conventional cold drawing apparatus. The strength of the trolley wire can be increased by this cold drawing process. In order to increase the strength for certain, in this case, the reduction of area should be 20% or more.

Thereafter, the composite wire after the drawing process is grooved, so that a pair of V-shaped grooves 4 are formed on copper covering layer 3 which covers steel core 1, as shown in the sectional view of FIG. 1. Thus, the trolley wire is completed. The trolley wire can be installed so that the grooved portions are seized by means of fixtures made of copper.

According to the present embodiment, the steel wire is coated with copper by the so-called dip forming method, so that the copper-clad steel trolley wire can be manufactured at low cost. Principally, the trolley wire is a thick wire with a diameter of 10 mm or more, and the covering layer (copper) must be formed thick enough to allow the formation of grooves for installation. Thus, if electroplating or another method is used for the manufacture of the copper-clad steel wire, the manufacturing cost is very high. According to the present embodiment, on the other hand, the wire is coated with copper by the dip forming method to form the copper-clad steel wire, which is dipped again in molten copper. By this method, a composite wire for use as a trolley wire can be manufactured at low cost.

The following is a description of the result (example) of manufacture of a copper-clad steel trolley wire, compared with the result of manufacture of the prior art trolley wire.

In this example, a JISG-3505 (SWRM10) mild steel wire (14-mm diameter) was used as the steel core. This mild steel wire was scalped to a diameter of 12.7 mm by means of shaving die 12, straightened by means of straightening unit 14, and then fed to coating unit 20. In this case, the length of a bend at a 1,000-mm-length portion was able to be restricted to 3 to 10 mm by suitably adjusting the spaces between rollers 14a, 14b and 14c. Without the use of straightening unit 14, the steel wire will bend for a length of about 40 to 60 mm at the 1,000-mm-length portion, and therefore, will not be able to be steadily passed through inlet hole 23.

A copper-clad cast steel wire composed of steel wire 1 having copper on the peripheral surface thereof was formed in coating unit 20, and was then subjected to the first cycle of hot rolling. Thereafter, the copper-clad steel wire was dipped again in molten copper to increase its copper covering rate. The resulting copper-clad cast steel wire, having undergone the two stages of dip forming, was subjected to a second cycle of hot rolling (rolling ratio: 35%), whereupon a composite wire of 17-mm diameter was obtained. This second hot rolling cycle caused the steel wire and the copper or copper-alloy region to be firmly bonded to each other.

Subsequently, the resulting wire was subjected to cold-drawing at a rate of 50%, and was then grooved. Thereupon, a trolley wire having the cross-sectional shape shown in FIG. 1 and a cross-sectional area of 110 mm² was obtained.

In this manner, trolley wires of Examples P1, P2 and P3, having different copper covering rates, were manufactured. The copper covering rate can be changed variously by adjusting the immersion time, dipping frequency, etc. of the steel wire in crucible 22. Thus, copper covering layers with desired thicknesses were formed.

These trolley wires were measured for electrical conductivity and tensile strength, and tested for fitting capability, ease of wear limit detection, and wear resistance. Table 2 shows the results of these measurements or tests along with test results for the conventional trolley wires.

TABLE 2

|  |  | Copper Covering Rate (%) | Conductivity (% IACS) | Tensile Strength (kgf/mm²) | Fitting Capability | Ease of Wear limit detection | Wear Resistance |
| --- | --- | --- | --- | --- | --- | --- | --- |
| Example | P1 | 75 | 77 | 52 | Good | Good | Good |
|  | P2 | 80 | 81 | 49 | Good | Good | Good |
|  | P3 | 90 | 90 | 42 | Good | Good | Good |
| Comparative | P1 | 95 | 95 | 38 | Good | Good | Moderate |
| Example | P2 | 57 | 61 | 62 | Good | Moderate | Good |
| Prior | P1 | 100 | 99 | 35 | Good | Poor | Moderate |
| Art | P2 | 100 | 75 | 40 | Good | Poor | Good |
| Example | P3 | — | 49 | 24 | Poor | Poor | Good |

Comparative Examples P1 and P2 are cases in which the copper covering rate is too high and too low, respectively. Prior Art Examples P1, P2 and P2 are cases of a copper trolley wire, copper-alloy trolley wire, and aluminum-clad steel trolley wire. The cross-sectional area of Prior Art Example P3 is 200 mm², while that of the other trolley wires is 110 mm².

As shown in Table 2, Examples P1 to P3 have satisfactory electrical conductivity and tensile strength for high-conductivity, high-strength trolley wires.

Although Prior Art Examples P1 and P2 have satisfactory electrical conductivity, they lack in strength. According to Examples P1 to P3, the wear limit can be easily detected, and the fitting capability and wear resistance are high. Moreover, Examples P1 to P3 are high in corrosion resistance, since the copper portion and the steel wire portion are firmly bonded.

Although Comparative Example P1 has very high electrical conductivity, its copper covering rate is so high that its tensile strength and wear resistance are low or poor. Although Comparative Example P2 has satisfactory tensile strength and wear resistance, its copper covering rate is so low that its electrical conductivity is lower than those of Prior Art Examples P1 and P2. In this case, moreover, the steel core is exposed long before the wear limit is reached, so that the exposure of the core cannot be utilized for the detection of the wear limit which indicates the time for rewiring.

Since Prior Art Examples P1 and P2 are copper and copper-alloy trolley wires, respectively, their strength and wear resistance are low or poor. Since Prior Art Example P3 is an aluminum-clad steel trolley wire, moreover, its strength is low, and galvanic corrosion is caused between the wire and the copper-alloy fixtures. In this case, therefore, the fitting capability is poor.

Although the trolley wires with a cross-sectional area of 110 mm$^2$ have been described in connection with the above embodiment, it is to be understood that the present invention may be also applied to trolley wires of any other suitable types, e.g., ones with a cross-sectional area of 170 mm$^2$.

In the above embodiment, moreover, copper is built up and solidified on the steel wire. Instead of using copper, however, copper alloy may be used without failing to maintain the desired values for the electrical conductivity and strength.

Further, the number of copper build-up cycles is not limited to two, and may be three or more.

The following is a description of the results of an investigation of the relationships between cold drawing of the copper-clad steel wire and the strength thereof.

The tensile strength was examined after variously setting the degree of wire drawing (% of reduction of area) in combination with two copper covering rates, 75% and 90%. Table 3 shows the results of this examination.

TABLE 3

| Copper covering rate (%) | Degree of wire drawing (%) | | | | |
|---|---|---|---|---|---|
| | 10 | 20 | 30 | 40 | 50 |
| 75 | 35 | 42 | 45 | 50 | 52 |
| 90 | 31 | 35 | 38 | 40 | 42 |

The tensile strength, which varies with the copper covering rate, can be made higher than that of the conventional trolley wires by using the degree of wire drawing of 20% or more.

The following is a description of the results of tests on the influences on the value of the ratio X/R.

The manufacturing conditions which influence the value of the ratio X/R are the hot rolling conditions, and in particular, the shape of the concave surface of the caliber roll and the rolling ratio greatly influence the ratio X/R. The ratio X/R can be variously changed by suitably selecting these manufacturing conditions. If the rolling ratio for a first pass of the cast rod to be hot-rolled is too high, for example, the ratio X/R is liable to be lower than 1.0 even after a second pass. If the rolling ratio for the first-pass is too low, on the other hand, the ratio X/R is much higher than 1.0. Since the ratio X/R can be variously changed by thus selecting the rolling conditions, copper-clad steel wires with various cross-sectional shapes were manufactured by variously selecting the rolling conditions in the first cycle of dipping and rolling. Further, the copper-clad steel wires were drawn, and the production or occurrence of longitudinal grooves and/or blushing was examined. As a result, neither grooves nor blushing was detected with the ratio X/R ranging from 0.97 to 1.10, as shown in Table 4. When the ratio X/R is 0.92 or 1.20, grooves or blushing was formed.

TABLE 4

| X/R | Grooves or Blushing |
|---|---|
| 0.92 | formed |
| 0.97 | none |
| 1.00 | none |
| 1.10 | none |
| 1.20 | formed |

Also in a second dip coating process, the surface is ground by means of the shaving die. If the grooves formed in the first rolling cycle are shallow, therefore, they can be removed through grinding by means of the shaving die. However, a uniform thickness cannot always be obtained by scalping work. It is very advisable, therefore, to develop hot-rolled rods which can be easily drawn into a grooveless circular cross section, in view of improvement in material, as in the case of the present invention.

In the hot rolling process after the second dip coating process, moreover, the aforesaid conditions are not essential. The reason is that if the copper covering rate increases as in the second and the subsequent dipping processes, copper is mostly deformed by the rolling, and restrictions from the less deformable, steel core portion are eased, so that neither grooves nor blushing can be caused.

What is claimed is:

1. A process for manufacturing a high-conductivity copper-clad steel trolley wire, comprising the steps of:
   dipping a steel wire in molten copper or molten copper-alloy in a continuous manner, so that said molten copper or molten copper-alloy builds up and solidifies on the peripheral surface of said steel wire, thereby obtaining an initial copper-clad steel wire;
   subjecting said initial copper-clad steel wire to a first cycle of hot-rolling by means of a caliber roll, to obtain a first hot rolled wire;
   dipping said first hot rolled wire at least once in molten copper or molten copper-alloy, so that molten copper or molten copper-alloy builds up and solidifies thereon, producing a final copper-clad steel wire;
   subjecting said final copper-clad steel wire to a second cycle of hot-rolling at a temperature of from 750° to 850° C., with a rolling ratio of from 10 to 40%, obtaining a second hot-rolled wire; and
   cold-rolling said second hot rolled wire so that a reduction of area of 20% or more is obtained.

2. The method according to claim 1, wherein said first cycle of hot rolling by means of the caliber roll is effected under the condition based on the range given by $0.97 \leq X/R \leq 1.10$, where R is the distance between the surface of the wire at a concave contact position of the caliber roll and the center of the wire, and X is the distance between the surface of the wire at a non-contact position of the caliber roll and the center of the wire.

3. The method according to claim 1, wherein said molten copper or molten copper alloy is stored in a vessel, and said steel wire is introduced into the vessel through the bottom portion thereof after being straightened so that said molten metal builds up on the peripheral surface of the wire as the wire is drawn up in the vessel.

4. The method according to claim 2, wherein said molten copper or molten copper alloy is stored in a vessel, and said steel wire is introduced into the vessel through the bottom portion thereof after being straightened so that said molten metal builds up on the peripheral surface of the wire as the wire is drawn up in the vessel.

* * * * *